United States Patent Office 3,457,206
Patented July 22, 1969

3,457,206
WATER DISPERSIBLE ALKYD RESINS COMPRISING ESTERIFIED UNITS OF AN ALKOXYPOLYOXYETHYLENE GLYCOL
Francis I. Tonner, Lynn, Mass., assignor to A. E. Staley Manufacturing Company, Decatur, Ill., a corporation of Delaware
No Drawing. Filed May 16, 1966, Ser. No. 550,152
Int. Cl. C08g 17/16, 17/00
U.S. Cl. 260—22
2 Claims

ABSTRACT OF THE DISCLOSURE

A film forming water-soluble alkyd comprising esterified units of (A) polyhydric alcohol free of carboxylic acid group, (B) polyhydric alcohol containing one free carboxylic acid group, (C) ethylenically unsaturated fatty acid of at least ten carbon atoms, (D) polycarboxylic acid wherein said polycarboxylic acid comprises adduct of alpha,beta-ethylenically unsaturated dicarboxylic acid and ethylenically unsaturated fatty acid of at least ten carbon atoms and (E) an alkoxypolyoxyethylene glycol having a molecular weight of from about 120 to 750.

This invention relates to a film forming water-soluble alkyd. More particularly this invention relates to a film forming water-soluble alkyd comprising esterified units of (A) polyhydric alcohol free of carboxylic acid group, (B) polyhydric alcohol containing one free carboxylic acid group, (C) ethylenically unsaturated fatty acid of at least ten carbon atoms, (D) polycarboxylic acid wherein said polycarboxylic acid comprises adduct of alpha,beta-ethylencially unsaturated dicarboxylic acid and ethylenically unsaturated fatty acid of at least ten carbon atoms and (E) an alkoxypolyoxyethylene glycol having a molecular weight of from about 120 to 750.

As is well known, paints are composed of a solid (the pigment) and liquid "vehicle," which normally consists of a film forming binder and volatile solvent. In recent years water has become the preferred volatile solvent because of the higher cost, hazards (flammability and toxicity) and objectionable odor of organic solvents. Almost all water-based paints on the market today are based on aqueous emulsion polymer vehicles, such as those resulting from emulsion polymerization of (meth)acrylate and vinyl acetate. While these water-based emulsion polymer paints have many desirable properties, they normally exhibit relatively poor gloss and have poor wet edge. The poor wet edge of emulsion polymer paints is due to the fact that film formation is quite rapid, taking place by coalescence and subsequent fusion of "soft" polymer particles. As a result of the wet edge properties of latex paints, care must be exercised in their use in order to prevent the formation of aesthetically undesirable lap marks on walls etc.

Other water-based paints have been introduced with less success. Most of thse contain a so-called water-soluble alkyd and minor amounts of an organic cosolvent or coupling solvent. Paints based on these polymers have markedly better wet edge properties than paints based on aqueous emulsion polymers. This is due to the fact that film formation is accomplished through a prolonged oxidative cross-linking of the relatively low molecular weight alkyd. Further, these water-soluble alkyd systems exhibit better leveling, gloss and substrate adhesion than the emulsion-type products. However, paints based on water-soluble alkyds yellow excessively and have high tack much like the conventional alkyd paints applied from solely an organic solvent. In addition water-soluble alkyd based paints exhibit poor water-resistance until fully cured.

As indicated above, the "water-soluble alkyds" usually require the presence of an organic cosolvent in order to give the alkyd true solubility in aqueous alkaline mediums. However, it is, of course, desirable to be able to provide truly water-soluble alkyds which are soluble in aqueous alkali without the aid of an organic cosolvent or with very small increments of same.

The general object of this invention is to provide a new water-soluble alkyd resin is soluble in aqueous alkali without the aid of an organic cosolvent or very small increments of same. Another object of this invention is to provide a water-soluble alkyd resin having excellent non-yellowing properties. A further object of this invention is to provide a water-soluble alkyd having good water-resistance. Other objects will appear hereinafter.

In one aspect this invention is a film forming water-soluble alkyd comprising esterified units of (A) polyhydric alcohol free of carboxylic acid group, (B) polyhydric alcohol containing one free carboxylic acid group, (C) ethylenically unsaturated fatty acid of at least ten carbon atoms, (D) polycarboxylic acid wherein said polycarboxylic acid comprises adduct of alpha,beta-ethylenically unsaturated dicarboxylic acid and ethylenically unsaturated fatty acid of at least ten carbon atoms and (E) an alkoxypolyoxyethylene glycol having a molecular weight of from about 120 to 750.

In a second aspect this invention is a proces of forming a water-soluble alkyd comprising the steps of reacting a partial ester of a polyhydric alcohol free of carboxylic acid group and an ethylenically unsaturated fatty acid of at least ten carbon atoms with polycarboxylic acid wherein said polycarboxylic acid comprises an alyha,beta ethylenically unsaturated dicarboxylic acid, polyhydric alcohol containing one free carboxylic acid group an alkoxypolyoxyethylene glycol having a molecular weight of from about 120 to 750.

In a third aspect this invention is a process of forming a water-soluble alkyd comprising the steps of reacting a partial ester of a polyhydric alcohol free of carboxylic acid group and an ethylenically unsaturated fatty acid of at least ten carbon atoms with polycarboxylic acid to form an alkyd, reacting said alkyd with polyhydric alcohol containing one free carboxylic acid group and reacting the resulting alkyd under adduct forming conditions with an alpha,beta-ethylenically unsaturated dicarboxylic acid and an alkoxypolyoxyethylene glycol having a molecular weight of from 120 to 750 or half-ester thereof.

In another aspect this invention is a process of forming a water-soluble alkyd comprising the steps of reacting a partial ester of a polyhydric alcohol free of carboxylic acid group and an ethylenically unsaturated fatty acid of at least ten carbon atoms with polycarboxylic acid to form an alkyd and reacting said alkyd under adduct forming conditions with a alpha,beta-ethylenically unsaturated dicarboxylic acid and an alkoxypolyoxyethylene glycol having a molecular weight of from 120 to 750 or half-ester thereof.

I have now found that the objects of this invention can be attained by providing a film water-soluble alkyd comprising esterified units of (A) polyhydric alcohol free of carboxylic acid group, (B) polyhydric alcohol containing one free carboxylic acid group, (C) ethylenically unsaturated fatty acid of at least ten carbon atoms, (D) polycarboxylic acid wherein said polycarboxylic acid comprises adduct of alpha,beta-ethylenically unsaturated dicarboxylic acid and ethylenically unsaturated fatty acid of at least ten carbon atoms, and (E) an alkoxypolyoxyethylene glycol having a molecular weight of from about 120 to 750.

The water-soluble alkyds of this invention can be prepared by a variety of techniques, such as by condensing together all of the alkyd forming components (A), (B), (C), (D), and (E). Usually, the water-soluble alkyds of this invention are prepared by first reacting a partial ester of a polyhydric alcohol having on an average at least one (preferably at least 1.5) free hydroxyl group per molecule with a polycarboxylic acid to form an alkyd. If desired the polycarboxylic acid can comprise an alpha,beta-ethylenically unsaturated dicarboxylic acid with the reaction being performed under adduct forming conditions as explained below. Polyhydric alcohol containing one free carboxylic acid group and/or alkoxypolyoxyethylene glycol can be included with the polycarboxylic acid. Best results have been obtained by reacting a partial ester of a polyhydric alcohol and ethylenically unsaturated fatty acid having on an average at least one (preferably at least 1.5) free hydroxyl group per molecule with a polycarboxylic acid to form an alkyd, transesterifying the resultant alkyd with a polyhydric alcohol containing one free carboxylic acid group and then reacting this product under adduct forming conditions with an alpha,beta-ethylenically unsaturated dicarboxylic acid and an alkoxypolyoxyethylene glycol having a molecular weight of about 120 to 750, which are preferably added in the form of a half-ester of the two components. This latter route yields water-soluble alkyds which are dilutable with water infinity without the precipitation of the alkyd. Other techniques yield somewhat inferior products. For example, if the alkyd resin is prepared by adding the alkoxypolyoxyethylene glycol at an earlier stage in the polyesterification reaction, the resultant products tend to precipitate out of aqueous alkali when diluted down with water to within the range of about 10 to 15% by weight solids. In other words, alkyds prepared by other techniques are not infinitely dilutable with water without precipitating from the aqueous alkaline medium and at low total solids require the addition of a suitable coupling cosolvent. However, such products are quite advantageous since they require considerably less coupling solvents than alkyds prepared in the same manner without any alkoxypolyoxyethylene glycol. The same results cannot be obtained by replacing the alkoxypolyoxyethylene glycol with polyhydric alcohol of the same configuration since alkyds based on polyhydric alcohols having a high concentration of ether groups have considerably poorer water-resistance than the products of this invention.

PARTIAL ESTER OF FATTY ACID AND POLYHYDRIC ALCOHOL

The first step of my process usually comprises providing a partial ester of an ethylenically unsaturated fatty acid of at least 10 carbon atoms and a polyhydric alcohol. The partial ester may be prepared by any of the well-known techniques of esterification. For example, free ethylenically unsaturated fatty acids such as may be obtained by hydrolysis of drying oils or oils containing drying oils acids may be reacted with one or more polyhydroxy compounds containing two or more hydroxyl groups in such proportion as to provide on an average at least one free hydroxyl group in each molecule or the resultant polyhydric alcohol-ethylenically unsaturated fatty acid ester and preferably on an average at least one and one-half free hydroxyl per molecule.

A more common procedure in preparing esters of ethylenically unsaturated fatty acids is to partially alcoholize a drying oil such as linseed oil or soybean oil with a polyhydric alcohol such as glycerol. In the event that glycerol is employed as the polyhydric alcohol for alcoholysis of the drying oil, diglycerides and monoglycerides are formed in substantial quantities. Of course, when conventional oils are employed in the alcoholysis reaction, there will be considerable variation in the structure of the products. In most instances, however, many of the acid groups of at least 10 carbon atoms will contain a plurality of double bonds. It may also be that some monoglycerides are formed having only saturated fatty acid groups and ordinarily there will be some unchanged polyhydric alcohol and unchanged glycerides remaining in the mixture. However, a majority of the ester molecules contain both free-hydroxyl groups and ethylenically unsaturated fatty acid moieties of at least ten carbon atoms.

Any polyhydric alcohol may be employed in preparing the esters of ethylenically unsaturated fatty acids. Preferably, the polyhydric alcohol contains from about 3 to 6 hydroxyl groups per molecule. Examples of polyhydric alcohols which may be used in this invention include ethylene glycol, diethylene glycol, triethylene glycol, propylene glycol, glycerol pentaerythritol, 1,1,1-trimethylolethane, 1,1,1 - trimethylolpropane, sorbitol, tetramethylolcyclohexanol, alpha - methyl glucoside, polyol glycosides, erythritol, dipentaerythritol, polyallyl alcohol (such as RJ–100, which is a copolymer of allyl alcohol and styrene), etc. as well as mixtures of two or more of the above polyhydric alcohols. These may be employed either to esterify the fatty acids or to alcoholize the triglycerides of the acids by ester interchange.

The ethylenically unsaturated carboxylic acids of at least ten carbon atoms in the form of free acids, or their glycerides include the acids of substantially any of the glyceride oils recognized as having drying oil properties. The acids of so-called semi-drying oils are also included in the term drying oil acids and partial esters of this class (drying oil acid esters) are preferred. The partial esters of drying oil acids contain at least some polyunsaturated fatty acid chains as well as some saturated carboxylic acids, such as palmitic and stearic acid, and monoethylenically unsaturated acids, such as oleic acids. It is to be understood that concentrates of unsaturated acids such as linoleic acid and linolenic acid, which may be obtained by distillation operations in well-known manner, may also be employed in the preparation of the base partial esters. Convenient sources of these various acids are drying and semi-drying oils, such as linseed oil, cottonseed oil, safflower oil, soybean oil, tung oil, oiticica oil, menhaden oil, dehydrated caster oil, sardine oil, etc. Soap stocks and foots acids from the refining of these oils are also suitable sources of ethylenically unsaturated fatty acids of at least 10 carbon atoms which may be utilized in the process of this invention.

If desired, the alkoxypolyoxyethylene glycol can be included with polyhydric alcohol in the formation of the partial ester of ethylenically unsaturated fatty acid and polyhydric alcohol. When this technique is employed about 20–40% of the alkoxypolyoxyethylene glycol is esterified with fatty acid chains, the remainder reacting subsequently. The final water-soluble alkyd is capable of dissolving in aqueous alkali at high solids without the use of a coupling cosolvent. However, when the alkyd is diluted down with water to about 15% total solids, the water soluble alkyd tends to come out of solution and requires the aid of a suitable cosolvent in order to assure that the polymeric material stays in solution.

When the esters of ethylenically unsaturated fatty acids and polyhydric alcohol are prepared by alcoholysis of a glyceride oil in the manner previously referred to, the technique commonly employed in the preparation of esters for the modification of alkyd resins may be utilized. Such alcoholysis involves the heating of oil with the desired proportion of polyhydric alcohol in order to obtain a partial ester containing the desired number of free-hydroxyl groups. The reaction is usually conducted in the presence of an alcoholysis catalyst such as litharge, lithium ricinoleate, etc. It is also convenient to blanket the reaction with an inert gas, such as nitrogen, designed to prevent oxidation of the double bonds of the hydrocarbon portions of the acid. The alcoholysis reaction may be conducted at a temperature in a range of about 150° to 300° C. or higher for purposes of the present invention. In general the mole ratios of fatty acid and polyhydric alcohol or alcohols are selected to provide preferably on an average at least about 1.5 hydroxyl groups per molecule of partial ester. The resultant partial ester comprises from about 30 to 80% by weight of the final alkyd, preferably about 45 to 75% by weight.

POLYCARBOXYLIC ACID

As indicated above, the alkyd resins of this invention contain polycarboxylic acid moieties in esterified and adduct forms. Suitable polycarboxylic acids include saturated (i.e. non-ethylenically unsaturated) polycarboxylic acids such as phthalic acid, phthalic anhydride, terephthalic acid, isophthalic acid, adipic acid, sebacic acid, glutaric, succinic, trimellitic acid, trimellitic anhydride, hemimellitic acid, etc.; alpha,beta-ethylenically unsaturated dicarboxylic acids, such as maleic, maleic anhydride, fumaric acid, itaconic acid, itaconic anhydride, mesaconic acid, citraconic acid, chloromaleic acid, maleic acid, etc.; and polycarboxylic acids capable of forming alpha,beta-ethylenically unsaturated dicarboxylic acids on heating, such as malic acid or citric acid, etc.

In order to impart the necessary properties to the alkyd resins of this invention, the polycarboxylic acid is used in a concentration of from 1 to 4 equivalents (preferably 1.5 to 3 equivalents) per equivalent of fatty acid in the partial ester and at least 5 mole percent of the polycarboxylic acid is alpha,beta-ethylenically unsaturated dicarboxylic acid or hydroxy polycarboxylic acid capable of providing said acid. In accordance with the provisions of this invention the alpha,beta-ethylenically unsaturated dicarboxylic acid (maleic acid or maleic anhydride) and/or polycarboxylic acid capable of forming alpha,beta-ethylenically unsaturated dicarboxylic acid forms an adduct with the ethylenically unsaturated fatty acid chains. The ethylenic group of the dicarboxylic acid adds to a hydrogen atom alpha to an ethylenic group in the fatty acid moiety of the partial ester. In this adduct reaction, the ethylenic group of the alpha,beta-dicarboxylic acid becomes saturated while the double bond or double bonds of the esterified fatty moiety remain unsaturated. In the event that the fatty acid moiety contains conjugated ethylenically unsaturated double bonds (such as in oleostearic acid) or fatty moieties capable of isomerization under the reaction conditions to give conjugation, a Diels-Alder type adduct reaction also occurs. These "adduct reactions" may be considered to be addition reactions since no water is split off as a result of adduct formation. Hydrophobic chains of esterified fatty acids are rendered relatively hydrophilic by the free carboxy functions imparted by the alpha,beta-ethylenically unsaturated dicarboxylic acid.

As indicated above all of the polycarboxylic acid to be used in forming the water-soluble alkyd of this invention can be reacted with the fatty acid partial ester at one time. When this method is employed, it is desirable to react simultaneously the alkoxypolyoxyethylene glycol and 0.1 to 1.0 mole (preferably 0.2 to 0.6 mole) of polyhydric alcohol containing a free carboxylic acid group per equivalent of fatty acid in the partial ester. In this way, on an average at least about one of the free carboxyl groups on the adduct, reacts through polyesterification to form a side chain that contributes some hydrophilic character to the fatty acid chain portion of the adduct but less than that which is contributed by a free carboxyl group. It is believed that this esterification of one of the free carboxyl groups furnished by the alpha,beta-ethylenically unsaturated dicarboxylic acid to the adduct reduces the adverse effects on the water-resistance of applied coatings, caused by the presence of free carboxyl groups on vicinal (alpha,beta) or alpha,gamma carbon atoms. Alkyds prepared in this manner dissolve in dilute aqueous alkali. However, when diluted down with water to between about 10–15% solids, they tend to come out of solution in the absence of a small amount of organic cosolvent. In other words, at low solids, alkyds prepared in this manner require the presence of a small amount of cosolvent.

In the preferred method of operation about 60 to 95 mole percent of the polycarboxylic acid (preferably the saturated portion of polycarboxylic acid) to be used in forming the alkyd is reacted with partial ester (in the substantial absence of both alkoxypolyoxyethylene glycol and polyhydric alcohol containing a free carboxyl group) to form an alkyd, the resulting alkyd is reacted with polyhydric alcohol containing free carboxyl acid group and the remaining 5 to 40 mole percent of polycarboxylic acid, preferably in the form of half-ester of alpha,beta-ethylenically unsaturated dicarboxylic acid and alkoxypolyoxyethylene glycol, is reacted with the alkyd under conditions favoring adduct formation. Usually the addition of about 10 to 30 mole percent of unsaturated dicarboxylic acid (based upon the total concentration of polycarboxylic acid in the alkyd), in the form of the half-ester of alkoxypolyoxyethylene glycol, yields the best results. Products prepared in this manner dissolve in dilute aqueous alkali and are infinitely dilutable with water without precipitating-out of solution.

In general best results have been obtained with maleic anhydride and/or maleic acid (which forms the anhydride on heating) as the alpha,beta-ethylenically unsaturated dicarboxylic acid. Alkyds prepared with these acids have better color than alkyds produced without same. Other things being equal an alkyd prepared with the aforesaid acids have a Gardner color of 2 as opposed to about 6.

While all of the polycarboxylic acid used in this invention can be alpha,beta-ethylenically unsaturated, it is preferable to use one of the aforementioned saturated polycarboxylic acids, preferably a benzenedicarboxylic acid such as phthalic acid, its anhydride or isophthalic acid, in a concentration of 25–95 mole percent of the polyfunctional acids employed. Generally, when employing the preferred method of this invention the saturated polycarboxylic acids are used in the first polyesterification step with partial ester of unsaturated fatty acid in the substantial absence of both alkoxypolyoxyethylene glycol and polyhydric alcohol containing a free carboxyl group.

POLYHYDRIC ALCOHOL CONTAINING A FREE CARBOXYLIC ACID GROUP

In those cases where partial ester of the long chain ethylenically unsaturated fatty acid, polycarboxylic acid and alkoxypolyoxyethylene glycol are all condensed together in one step, polyhydric alcohol containing one free carboxyl is also used in a concentration of 0.1 to 1.0 mole (preferably 0.2 to 0.6 mole) per equivalent of fatty acid in the partial ester.

Suitable polyhydric alcohols containing a free carboxylic acid group are the alpha-dimethylol-monocarboxylic acids which conform to the structure:

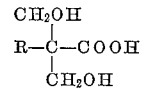

wherein R is hydrogen (dimethylolacetic acid) or a hydrocarbyl radical of 1 to 16 carbon atoms, such as methyl, ethyl, palmityl, etc. The configuration of these polyhydric alcohols is such that under polycondensation reaction conditions a substantial proportion of the free carboxyl groups are sterically hindered and do not readily take part in the esterification reaction. Accordingly, the main chain of the final polyester or alkyd contains randomly distributed internal free carboxylic acid groups which impart water-solubility to the alkyd. This random and more even distribution of free carboxylic acid groups along the polyester backbone appears to result in both improved solubility of the alkyd in paint compositions and to improved water resistance of the applied paints. Best results have been obtained with dimethylolpropionic acid, which is the preferred polyhydric alcohol containing one free carboxylic acid group. It has also been found that alkyds, which contain esterified moieties of dimethylolpropionic acid, are internally stabilized. Other things being equal, applied coatings based on these alkyds containing dimethylolpropionic acid and the preferred alpha,beta-ethylenically unsaturated acid moieties (maleic) do not yellow as much as other alkyd coatings.

In the preferred method of operation wherein dimethylolcarboxylic acid is reacted with preformed alkyd, prepared by the reaction of fatty acid partial ester and polycarboxylic acid, prior to the adduct reaction of the alpha,-beta-ethylenically unsaturated dicarboxylic acid and alkoxypolyoxyethylene glycol (preferably as the half-ester), the function of the dimethylolcarboxylic acid is not as clear cut. However, it is believed that this method of adding dimethylolcarboxylic acid results in the incorporation of a higher concentration of polar groups than in aforementioned techniques. Alkyds prepared in this manner have excellent color, dissolve in dilute aqueous alkali and are infinitely dilutable with water without precipitation of the alkyd. However, even without the inclusion of polyhydric alcohol containing one free carboxyl group in the alkyd, alkyds prepared by reacting under adduct forming condition half-ester of alpha,beta-ethylenically unsaturated dicarboxylic acid and alkoxypolyoxyethylene glycol with a preformed alkyd have excellent solution properties in aqueous alkali (i.e. are substantially infinitely dilutable).

ALKOXYPOLYOXYETHYLENE GLYCOL

Other things being equal, the alkoxypolyoxyethylene glycol component imparts water-solubility to alkyds in dilute aqueous alkali without the need for an organic coupling cosolvent. Suitable alkoxypolyoxyethylene glycols have a molecular weight of from about 120 to 750. These compounds can be represented by the structure $R(OCH_2CH_2)_nOH$ wherein $n$ is a number from 2 to 16 and R is lower alkyl, such as methyl or ethyl. When $n$ is less than 2 the resultant alkyd does not have the necessary water-solubility. Other things being equal, flow properties of the water-soluble alkyd become poorer as $n$ increases from about 12 to 16 and when $n$ is above about 16 the alkyd tends to be thixotropic. Best results have been obtained when $n$ ranges from about 4 to 10 inclusive.

The alkoxypolyoxyethylene glycol can be added at any point in the preparation of the water-soluble alkyd. However, best results are obtained by adding the alkoxypolyoxyethylene glycol in the form of the half-ester of alpha,beta-ethylenically unsaturated dicarboxylic acid to a preformed alkyd under adduct forming conditions. The resultant alkyds appear to have uniquely well-balanced hydrophilic and hydrophobic portions, which impart excellent water-solubility to the resultant alkyd and good water-resistance to applied coatings based thereon. When added in this manner or as an unesterified component, the alkoxypolyoxyethylene glycol is used in a concentration of from 0.05 to 0.4 mole (preferably 0.1 to 0.3 mole) per mole of polycarboxylic acid in the final alkyd. Aqueous alkaline solutions of alkyds prepared in this manner are substantially infinitely dilutable with water even in the absence of a polyhydric alcohol containing a free carboxyl group. When the alkoxypolyoxyethylene glycol is added at an earlier stage there are less advantageous results. For example, if the alkoxypolyoxyethylene glycol is included with polyhydric alcohol during the formation of fatty acid partial ester about 30% of alkoxypolyoxyethylene glycol reacts with fatty acid moieties in this step. Aqueous alkaline solution of alkyds prepared in this manner tend to come out of solution when diluted down with water to about 15% solids.

The half-ester of alpha,beta-ethylenically unsaturated dicarboxylic acid and alkoxypolyoxyethylene glycol can be prepared by typical esterification techniques. For example, equal moles of a suitable anhydride, such as maleic anhydride, can be reacted with alkoxypolyoxyethylene glycol at a temperature of about 50–200° C. If the corresponding fumaric acid half-ester is desired, the corresponding maleic acid half-ester can be isomerized in the manner described in U.S. Patent 3,190,899.

Irregardless of the order of reaction of the various components of this invention, the reaction is carried out at about 100–300° C. Normally the adduct formation step is carried out in the absence of diluents, since diluents tend to inhibit or reduce the extent or rate of adduct formation. The reactants are maintained at a temperature of 150 to 300° C. until water ceases to evolve from the condensation reaction; until the alkyd reaches a predetermined viscosity as determined by standard viscosity tests or until the alkyd reaches a predetermined acid number. Generally, it is desirable to terminate the final reaction when the alkyd reaches an acid number of from about 25 to 75 and has the desired viscosity. It is also desirable to sparge the reaction with an inert gas, such as nitrogen, designed to prevent oxidation of the double bonds of the esterfied fatty acids, and to remove water of esterification.

If desired, various high boiling monohydric alcohols, such as tetrahydrofurfuryl alcohol, ethoxyethanol, etc., can be added to the reaction medium in order to reduce the acid value of the alkyd, and/or to impart more advantageous air-drying properties to the alkyd. However, their use is optional. If desired monobasic aromatic acids, such as benzoic acid, can be employed for the same purpose.

The resulting alkyd resin can be shipped as such to the ultimate user for formulating into a suitable paint or dissolved in water at alkaline pH. The alkaline pH can be established with basic materials such as ammonia (or ammonium hydroxide); amines such as monoethyl amine, diethyl amine, triethyl amine, monoethanol amine, diethanol amine, triethanol amine, morpholine, etc.; alkali metal hydroxides such as sodium hydroxide, potassium hydroxide, etc.

In general it has been found that nitrogen containing bases such as ammonium hydroxide and amines tend to yield applied paint films which have more of a tendency to yellow that when an alkali metal hydroxide has been employed to establish the pH of the paint. On the other hand, ammonium hydroxide and amines tend to yield a somewhat more water resistant coating more rapidly than when an alkali metal hydroxide has been employed.

The following examples are merely illustrative and should not be construed as limiting the scope of the invention. The cloud point referred to in the examples was determined by starting with a high concentration of clear resin in an aqueous alkaline medium and diluting with water until the appearance of haze.

EXAMPLE I

One thousand forty parts by weight safflower oil, 165.20 parts by weight glycerin and 1.0 part by weight lithium ricinoleate was dispersed at 250° C. for about 1 hour. Then 280 parts by weight of isophthalic acid was added and the reaction mixture was maintained at 230° C. until the alkyd had an acid number less than 10. One hundred parts by weight of dimethylol propionic acid was added and the reaction mixture was maintained at 230° C. for 30 minutes. Then 500 parts by weight of a half ester of maleic anhydride and Carbowax 350 was added to the alkyd and cooked at 230° C. until the acid number of the alkyd was 60. The alkyd was cooled and adjusted with aqueous potassium hydroxide and methyl ethanolamine to a pH of 7.5. The product was substantially infinitely dilutable with water without the formation of any haze.

Essentially the same results were obtained by using 250 parts by weight of half ester of maleic anhydride and Carbowax 350. However, when the concentration of half ester of maleic anhydride and Carbowax 350 was reduced to 125 parts by weight, it was necessary to add 5% by weight butoxyethoxy propanol to the alkyd composition to form a substantially infinitely dilutable alkyd.

EXAMPLE II

This example illustrates the addition of alkoxypolyoxyethylene glycol at an earlier stage in the preparation of the alkyd. Three hundred thirty-six parts by weight safflower oil, 81 parts by weight pentaerythritol, 60 parts by weight Carbowax 750 and 0.6 part by weight lithium ricinoleate was dispersed at 250° C. for one hour. Then 30 parts by weight maleic anhydride, 90 parts by weight phthalic anhydride and 30 parts by weight dimethylol propionic acid were added to the reaction mixture. The composition was heated at 230° C. until the composition had an acid number of about 45. The composition was diluted with 10% by weight n-propoxy propanol and adjusted to a pH of 8 with potassium hydroxide. Haze formed when the composition contained 33% solids. When this example was repeated using the same mole percent Carbowax 350 in place of Carbowax 750, the resultant alkyd dissolved in aqueous alkali without the aid of a coupling cosolvent and had a cloud point of 15%.

EXAMPLE III

Seven hundred seventy-five parts by weight safflower oil, 142.5 parts by weight pentaerythritol 55.5 parts by weight glycerin, and 1.0 part by weight lithium ricinoleate were heated to 250° C. for about one hour. Then 75 parts by weight Carbowax 350 was added to the reaction mixture and the temperature was held at 275° C. for 30 minutes. At this point there was added 78.75 parts by weight maleic anhydride, 135 parts by weight phthalic anhydride, 78.75 parts by weight dimethylol propionic acid and 45 parts by weight of chinawood oil was heated at 210° C. until the alkyd had an acid number of between 25–28. The composition was cooled to 270° C. and additional phthalic anhydride was added to adjust the alkyl to an acid number of 50. The composition was cooled, mixed with 10% by weight butoxyethoxy propanol and adjusted to a pH of 7 with methyl ethanolamine. The composition had a cloud point of 12½%.

Since many embodiments of this invention may be made and since many changes may be made in the embodiments described, the foregoing is to be interpreted as illustrative only and my invention is defined by the claims appended hereafter.

I claim:

1. The process of preparing a film-forming infinitely water-dilutable alkyd resin which comprises the steps of (A) reacting together a polycarboxylic acid and partial ester of fatty acid and polyhydric alcohol under polyesterification conditions to form an alkyd, (B) reacting the alkyd of step A with an alpha,alpha-dimethylol monocarboxylic acid, (C) reacting the alkyd resulting from step B with at least one component selected from the group consisting of a mixture of alpha,beta-ethylenically unsaturated dicarboxylic acid and alkoxypolyoxyethylene glycol having a molecular weight of from about 120 to 750 and half ester of alpha,beta-ethylenically unsaturated dicarboxylic acid and alkoxypolyoxyethylene glycol having a molecular weight of from about 120 to 750 under conditions promoting adduct formation of the alpha,beta-ethylenically unsaturated polycarboxylic acid component.

2. The process of claim 1, wherein said alpha,beta-ethylenically unsaturated polycarboxylic acid comprises an acid selected from the group consisting of maleic acid and maleic anhydride.

References Cited

UNITED STATES PATENTS

| | | | |
|---|---|---|---|
| 2,275,843 | 3/1942 | Clocker | 260—22 |
| 2,941,968 | 6/1960 | McKenna | 260—22 |
| 3,001,961 | 9/1961 | Armitage et al. | 260—22 |
| 3,073,793 | 1/1963 | Greenspan et al. | 260—31.4 |
| 3,098,834 | 7/1963 | Jerabek | 260—22 |
| 3,190,899 | 6/1965 | Walton et al. | 260—404.8 |
| 3,297,605 | 1/1967 | Schroeder et al. | 260—22 |
| 3,345,313 | 10/1967 | Ruhf et al. | 260—22 |
| 3,366,563 | 1/1968 | Hart et al. | 260—22 |
| 3,379,548 | 4/1968 | Jen | 260—22 |
| 3,380,942 | 4/1968 | Menke | 260—22 |

DONALD E. CZAJA, Primary Examiner

R. W. GRIFFIN, Assistant Examiner

U.S. Cl. X.R.

117—167; 260—29.2, 31.4, 32.4, 32.6, 33.2, 33.4